J. W. PYNE.
FRUIT DRIER.
No. 83,313. Patented Oct. 20, 1868.
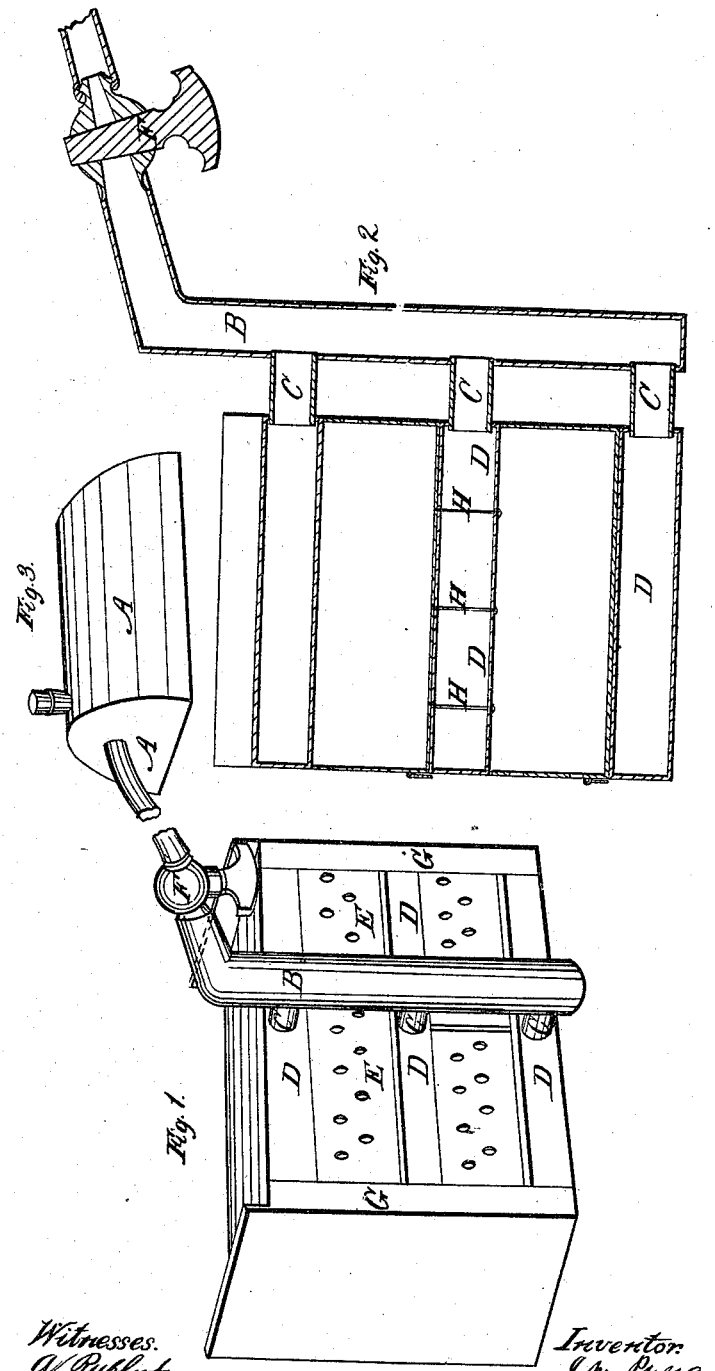

J. WALTER PYNE, OF DANVILLE, ILLINOIS.

Letters Patent No. 83,313, dated October 20, 1868.

IMPROVEMENT IN FRUIT-DRIERS.

The Schedule referred to in these Letters Patent and making part of the same.

*To all whom it may concern:*

Be it known that I, J. WALTER PYNE, of Danville, in the county of Vermilion, and State of Illinois, have invented a new and useful Improvement in Fruit-Driers; and I do hereby declare that the following is a full, clear, and exact description of the same, reference being had to the annexed drawings, making a part of this specification, in which—

Figure 1 is a perspective view of the apparatus complete, and

Figure 2 is a central elevation, showing the steam-chambers and the steam-induction pipes.

Similar letters refer to corresponding parts in the several figures.

This invention relates to what may be termed a dry-house, for drying fruits, and it consists in a structure for that purpose, constructed with alternate horizontal steam-spaces, and spaces into which drawers containing the fruit are placed; there being a series of such steam and fruit-spaces, arranged vertically, one above the other, the steam chambers or spaces communicating at each end with vertical steam-spaces which form the end of the structure.

In the drawings, A denotes a steam-generator, which may be located in any desired position with reference to the drying-structure.

B is the pipe which conducts the steam from the generator to the several connecting-pipes C.

C C C represent the several pipes which communicate with the steam-spaces D D D and the steam-pipe B, and which conduct the steam from the latter to the former.

D represents a series of steam-chambers, arranged vertically, and so as to leave a sufficient space between them for the reception of drawers, of, say, six to eight inches in depth, which contain the articles to be dried. These horizontal steam-chambers, at either or both of their ends, are provided with vertical chambers G, of similar construction, which together form the framework of the structure, and which are made of plate-iron or any other suitable material of sufficient thickness and strength to resist the pressure of steam upon their internal surfaces, and are riveted together in the usual manner; the horizontal plates, composing the tops and bottoms of these chambers, having stay-bolts secured through them, as shown at H, fig. 2, for the purpose of preventing them from being pressed apart by the steam contained in said chambers, the same means being adopted for securing the vertical plates of the end chambers.

E represents a series of drawers made of sheet-metal, or they may be made of any other material which is suitable for the purpose, and they are of a size which will admit of their being passed freely into the spaces between the steam-chambers. The front and rear plates of these drawers are perforated with a sufficient number of holes to allow any moisture that may be contained in the articles to be dried to escape through them, which greatly facilitates the drying of such articles.

F represents a cock or valve, placed in the steam-induction pipe, for regulating the flow of steam from the generator to the drier.

G represents the steam-chambers at the ends of the structure, above referred to.

H H represent the stay-bolts which secure the plates of which the structure is composed.

The operation of this device is as follows:

The fruit, or other articles to be dried, is placed within the drawers, after which they are slid into the spaces formed for them, where they are surrounded upon all sides with the heated plates of metal, which soon causes any juices which such articles may contain, or any moisture that may be upon their surfaces, to evaporate; such moisture passing off readily through the perforations in the sides of the drawers.

It is apparent that the temperature of the structure may be regulated by the pressure of steam within the generator, and by the amount which is allowed to pass the cock or valve F. It is also apparent that any water which may collect within the structure, as the result of condensation, or from any other cause, may be readily drawn off by means of a cock inserted in the bottom or any lower portion of the structure. It is further apparent that roots and other articles, as well as fruit, may be dried in this apparatus.

Having thus described my invention,

What I claim, and desire to secure by Letters Patent, is—

The combination of the perforated drawers with the surrounding steam-spaces, each one of which spaces is provided with an induction-pipe, substantially as shown and described.

In testimony whereof, I have signed my name to this specification in the presence of two subscribing witnesses.

J. WALTER PYNE.

Witnesses:
ED. E. FISHER,
ISAAC FISHER.